April 22, 1952  E. WILDHABER  2,593,510
FRICTION DRIVE

Filed Jan. 4, 1949  5 Sheets-Sheet 1

INVENTOR.
ERNEST WILDHABER
BY
ATTORNEY

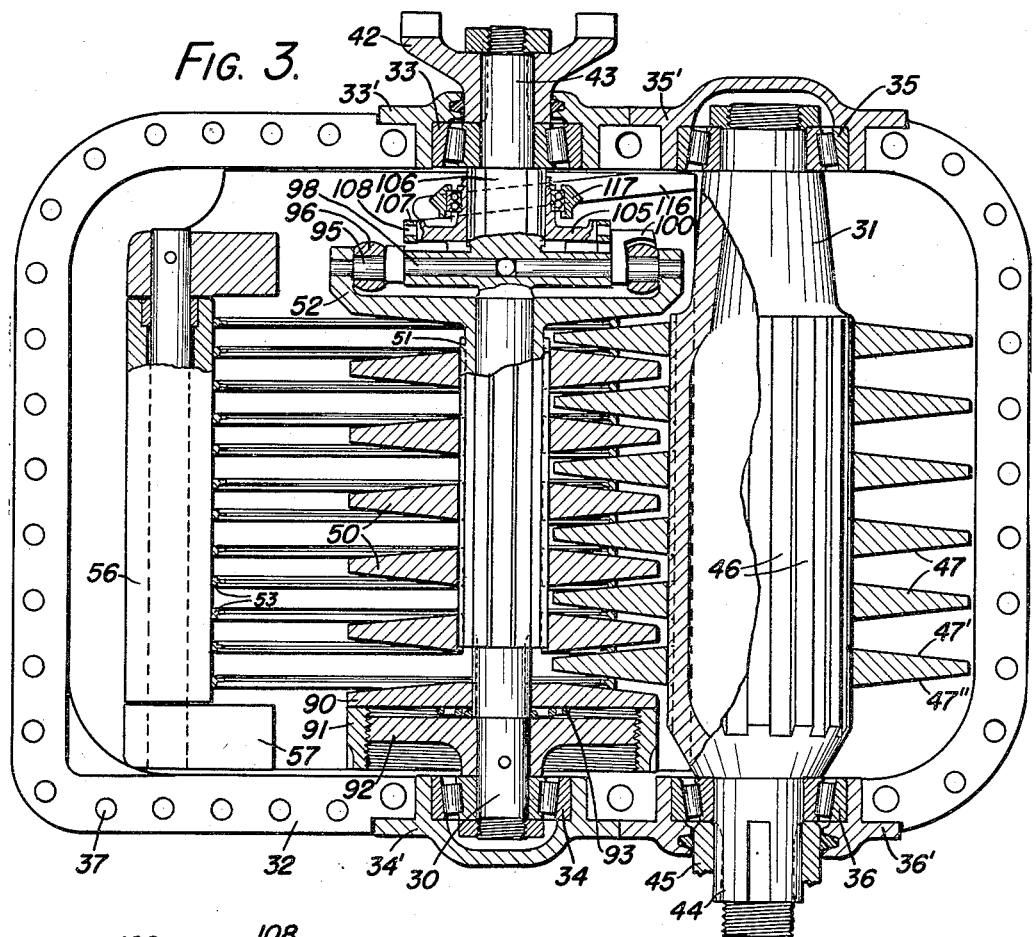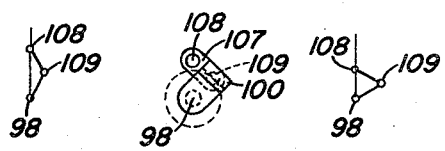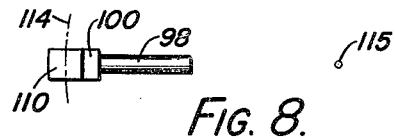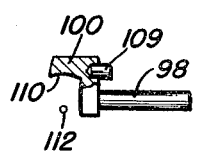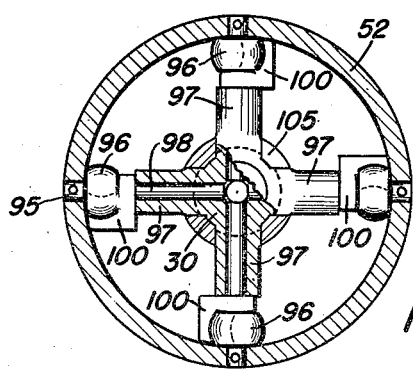

April 22, 1952  E. WILDHABER  2,593,510
FRICTION DRIVE

Filed Jan. 4, 1949  5 Sheets-Sheet 3

INVENTOR.
ERNEST WILDHABER
BY
ATTORNEY

April 22, 1952     E. WILDHABER     2,593,510
FRICTION DRIVE
Filed Jan. 4, 1949     5 Sheets-Sheet 4
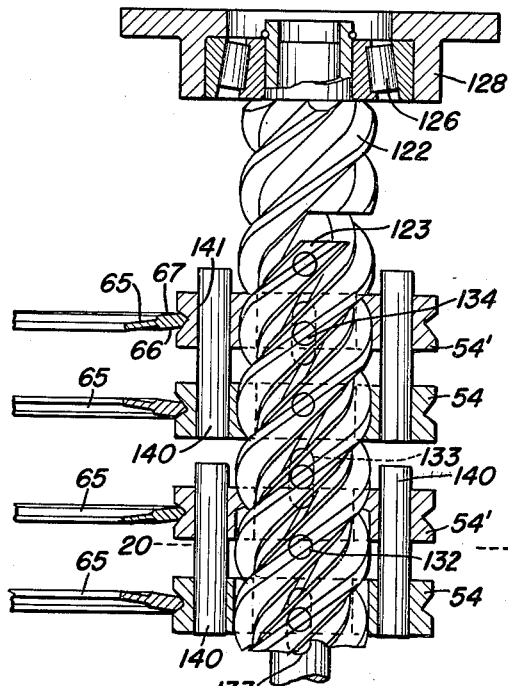
FIG. 18.
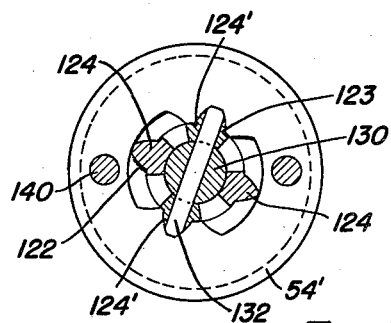
FIG. 20.
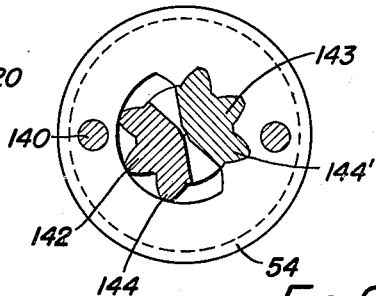
FIG. 22.
FIG. 19.
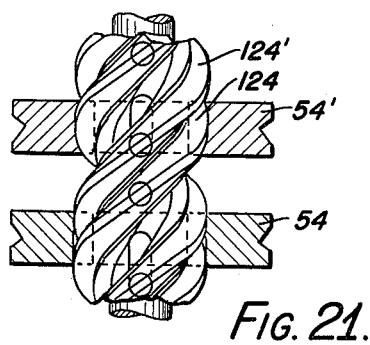
FIG. 21.
INVENTOR.
ERNEST WILDHABER
ATTORNEY April 22, 1952 E. WILDHABER 2,593,510
FRICTION DRIVE
Filed Jan. 4, 1949 5 Sheets-Sheet 5

INVENTOR.
ERNEST WILDHABER
BY
ATTORNEY

Patented Apr. 22, 1952

2,593,510

UNITED STATES PATENT OFFICE 2,593,510

FRICTION DRIVE

Ernest Wildhaber, Brighton, N. Y.

Application January 4, 1949, Serial No. 69,168

16 Claims. (Cl. 74—193)

The present invention relates to friction drives and particularly to friction drives which can be adjusted so that different speed ratios can be obtained.

One object of the invention is to minimize the friction loss in the drive by employing as small a contact pressure between the load-transmitting friction surfaces as possible and as is compatible with safe power transmission at all ratios.

Another object of the invention is to provide a friction drive in which the contact pressure is proportional to the torque transmitted through one of the rotating elements of the drive, and is also dependent on the ratio to which the transmission is adjusted. In other words, it is an object of the invention to provide a friction drive in which the contact pressure is made equal to the product of the torque transmitted through said rotating element and a factor which changes with the ratio.

A further object of the invention is to provide means for varying said factor with change in ratio of the drive.

Another object of the invention is to provide a new and improved friction transmission in which the drive and driven shafts are mounted to rotate on fixed axes but in which different speed ratios can nevertheless be obtained.

A further object of the invention is to provide a new and improved friction transmission with variable ratio, and capable of transmitting large loads between two rotating elements mounted on fixed axes.

Another object of the invention is to provide a friction transmission in which the loads are transmitted between two elements rotating on fixed parallel axes by means of novel friction rings which are adjustable to vary the transmitted ratio.

Another object of the invention is to provide suitable friction rings for a drive of the character described which will have proper frictional engagement on both sides.

Another object of the invention is to provide a friction drive in which pairs of friction rings are interposed between friction discs that are mounted on the drive and driven shafts, and in which means are provided for guiding the rings laterally so that the opposite forces of the pair of friction rings balance each other.

Another object of the invention is to provide a friction drive of the character described in which the friction rings may be guided laterally, without holding pairs of such rings in a definite axial position, so as to leave the rings free to adjust themselves.

Another object of the invention is to provide a friction transmission having driving and driven elements mounted on fixed parallel axes, in which the working loads are balanced and have no tendency to change the ratio.

A further object of the invention is to provide a friction transmission of this character where the transmission ratio can be changed in operation under load, and where no ratio change has to be made against the load.

A further object of the invention is to provide means for making ratio changes in operation under load with a minimum of effort.

Still another object of the invention is to provide a friction transmission in which axial pressure between the engaging elements of the drive may be created by an axially engaging coupling which has a variable lead and in which the axial pressure created is inversely proportional to said lead.

A further object of the invention is to provide a friction transmission with variable ratio having a coupling of the nature described in which the lead of the coupling is varied in accordance with the ratio to which the transmission is adjusted and is changed simultaneously with change in the ratio.

A still further object of the invention is to provide a friction transmission of the character described in which the lead of the coupling may be changed without materially affecting the backlash of the transmission.

Other objects of the invention will be apparent hereinafter from the specification and from the recital of the appended claims.

Several different embodiments of the invention are illustrated in the accompanying drawings in which:

Fig. 3 is a view partly in section and partly in plan taken at right angles to the view of Fig. 1;

Fig. 4 is a fragmentary transverse sectional view through the drive shaft and showing the torque transmitting coupling used in the transmission of Figs. 1 to 3 inclusive;

Fig. 5 is an axial view of one of the pivoted shoes used in the coupling of Fig. 4 and showing also its link-controlled angular adjustment;

Figs. 6 and 7 are diagrams showing different positions of said adjustment;

Figs. 8 and 9 are front and side views, respectively, of one of the pivoted shoes used in the coupling;

Figure 1:
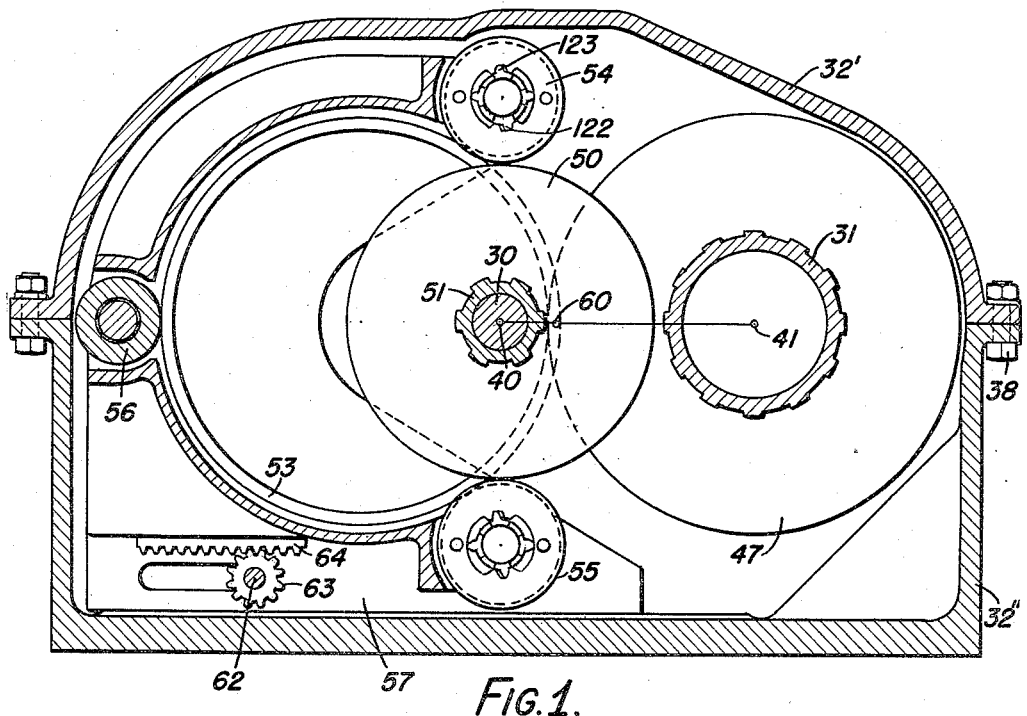
Fig. 1 is a transverse sectional view taken at right angles to the axes of the drive and driven shafts of a transmission constructed according to one embodiment of the invention.
Figure 2:
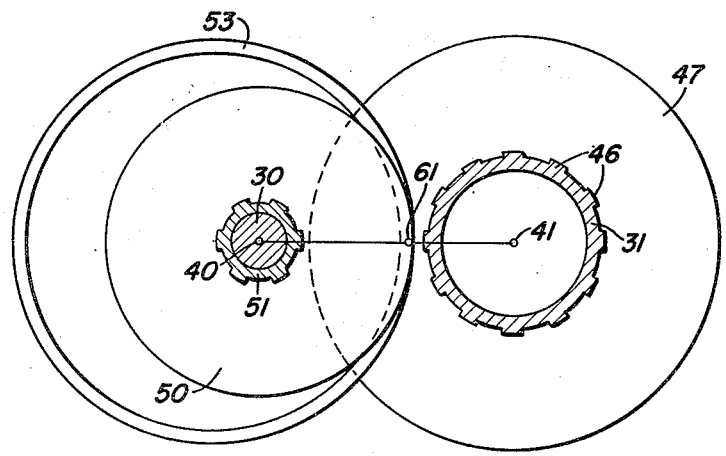
Fig. 2 is a similar sectional view but showing the main rotating elements only, and showing the friction rings adjusted to a different position from that of Fig. 1 to provide a different transmission ratio.
Figure 15:
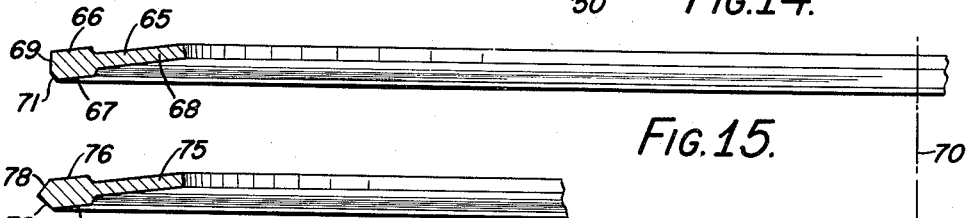
Figure 16:
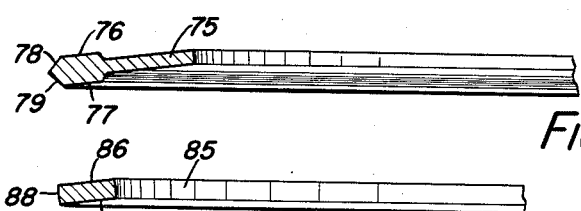
Figure 17:
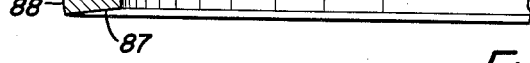
Figure 23:
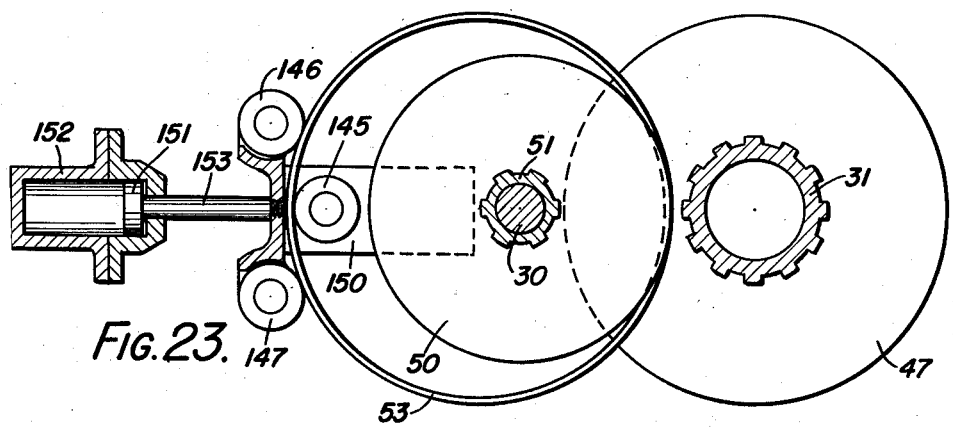
Figure 24:
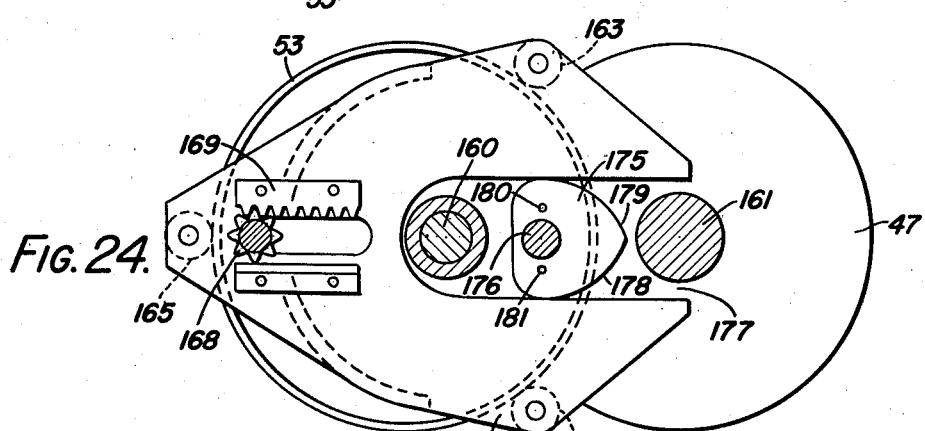
Figure 25:
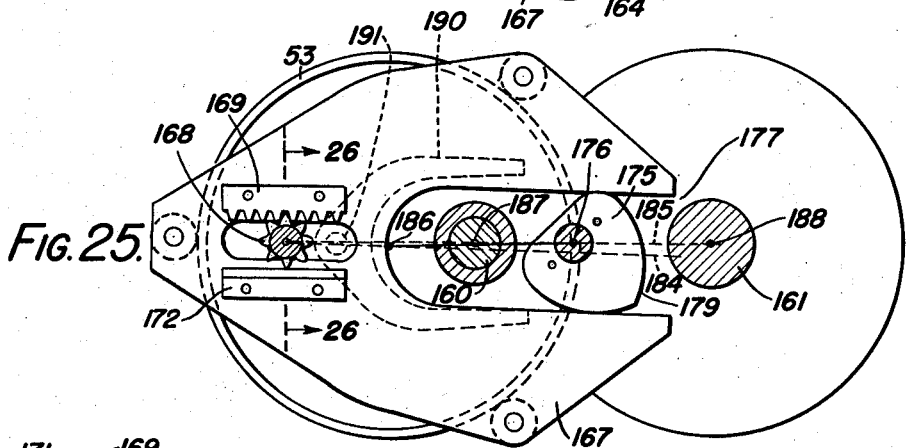
Figure 26:
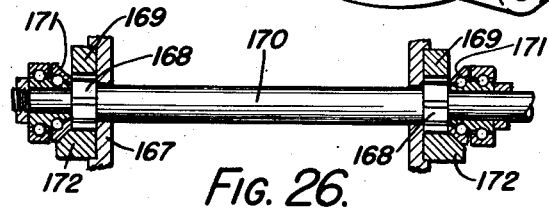

Figs. 15 to 17 inclusive are fragmentary axial sectional views of different forms of friction rings constructed according to the present invention;

Fig. 18 is a view, partially in plan and partially in section, showing the pair of coaxial helical splined shaft members and the rollers which are mounted thereon and which serve to guide laterally and radially the friction rings in the embodiment of the invention shown in Figs. 1 to 3 inclusive;

Figs. 19 and 21 are fragmentary sectional views, similar to Fig. 18, and showing the splined shaft members rotated to different positions to shift the guide rollers to different positions;

Fig. 20 is a section on the line 20—20 of Fig. 18;

Fig. 22 is a cross-sectional view, corresponding to Fig. 20, and showing a pair of splined shaft members of modified form and their cooperating roller;

Fig. 23 is a transverse sectional view, similar to Fig. 1, but showing a modified form of transmission arrangement;

Figs. 24 and 25 are views similar to Fig. 23, illustrating a further embodiment of the invention and showing, respectively, the friction rings adjusted to different positions for different ratio transmissions; and Fig. 26 is a fragmentary sectional view taken at right angles to the view of Fig. 25 showing the pinion shaft used in effecting the ratio adjustment, its mounting, and its mesh with the cooperating racks.

Reference will now be made first to the embodiment of the invention illustrated in Figs. 1 to 3 inclusive;

30 and 31 denote two parallel shafts which are mounted in the transmission casing 32, on antifriction bearings 33 and 34 and 35 and 36, respectively. The bearings are inserted in the end members 33′, 34′, 35′, and 36′, respectively, which are secured to the transmission casing in any suitable manner. The casing itself consists of an upper part 32′ and a lower part 32″ which are rigidly secured together by bolts 38 that pass through the holes 37.

The shafts 30 and 31 have their axes 40 and 41 fixed and parallel. In the embodiment of Figs. 1 to 3 inclusive, the shaft 30 may be the drive shaft and the shaft 31 the driven shaft. The power input to the drive shaft 30 may then be through a conventional form of coupling 42 (Fig. 3), which has engagement with the splined portion 43 of the shaft 30. The power output may be through a conventional coupling 45, of which only the hub part is shown, which has engagement with the splined shaft portion 44 of shaft 31. Of course, the direction of power application might be reversed; and the shaft 31 might be the drive shaft while the shaft 30 might be the driven shaft.

The shaft 31 has a plurality of friction discs 47 mounted thereon and connected thereto through the splines 46. These discs have conical surfaces 47′ and 47″ at opposite sides of equal cone angle. Through their splined connection with the shaft 31 they are adapted to rotate with the shaft but can move axially relative thereto.

Mounted on the shaft 30 is a splined sleeve 51 which is coaxial with shaft 30. Mounted upon this sleeve member and connected thereto by its splines are a plurality of friction discs 50 similar to the friction discs 47. The sleeve 51 has an enlarged head 52 at one end (Figs. 3 and 4) which is operatively connected with the shaft 30 by a torque-transmitting coupling to be further described. This coupling produces an axial separating force which increases with increased transmitted torque and which also depends upon the transmission ratio.

The discs 47 extend between the discs 50 and vice versa. They do not contact with one another, however. Power is transmitted through friction rings 53 which are interposed between the discs and which contact therewith under pressure largely produced by the coupling above mentioned. The friction rings have narrow, parallel, or equi-distant, working surfaces on opposite sides. They are mounted so that in operation they extend about one of the shafts and are eccentric to both shafts.

The friction rings are mounted between and guided by rollers 54, 55 and 56. The rollers 54 and 55 serve to guide the friction rings laterally as well as radially, while the roller 56 serves to guide the friction rings radially. All of these rollers are mounted on a common slide 57 which is adjustable in the plane of the axes 40 and 41 in a direction perpendicular to these axes.

As the tapered discs 47, 50 and the friction rings 53 are pressed together axially, applied torque loads will be transmitted from one set of discs to one side of the friction rings and then through the opposite side of the friction rings to the other set of discs. The transmission ratio depends on the radial position of the friction rings, that is, on adjustment of the slide 57.

In the position shown in Fig. 1 the largest reduction or ratio, which is possible with the transmission illustrated, is obtained. In this position, the rings 53 contact the discs 50 at the minimum radial distance from the axis 40 of the drive shaft 30 and the point of contact is also at the maximum distance from the axis 41 of driven shaft 31.

At one point, such as at point 60, true rolling takes place between the rings and the discs. Axial loads are applied so that this point 60 is inside of the working surface of a ring. This rolling point is nearly in the same radial position at opposite sides of the friction discs. The reduction ratio is then approximately equal to the proportion of the distances 41—60 and 40—60.

When the friction rings are adjusted to the position shown in Fig. 2, the smallest reduction or ratio is obtained. Here the friction rings 53 contact the discs 50 at their maximum radius and the discs 47 at their minimum radius. The reduction ratio is then approximately equal to the proportion of the distances of the rolling point 61 from the axes 41 and 40. The drive is then a speed-up rather than a reduction.

The ratio of the drive may be changed by adjusting slide 57. Adjustment of this slide is made by rotation of a shaft 62 which carries a pinion 63 that meshes with a rack 64 that is secured to the slide. Preferably there are two pinions 63 mounted at spaced distances on the shaft 62 to engage two spaced racks 64 that are secured to slide 57, as in the embodiment of the invention shown in Fig. 26. The teeth of the pinions and racks are then accurately aligned. Their simultaneous contact guides the slide and prevents the slide from cocking. This permits of simpler and lighter slide design. The slide may be locked in adjusted position by any suitable means, or by locking the pinion shaft 62.

Several different designs of friction rings which may be employed in the present invention are illustrated in Figs. 15, 16 and 17. The ring 65 of Fig. 15 has narrow working surfaces 66 and 67 at opposite sides which are offset laterally with reference to the non-working web portion 68 of the ring. The ring 65 has a cylindrical peripheral surface 69 and an adjacent conical surface 71. Surfaces 69 and 71 are adapted to be engaged by guide rollers which guide the ring laterally and radially. The ring 75 of Fig. 16 has narrow conical working surfaces 76 and 77 at opposite sides projecting laterally from a strengthening web, similar to ring 65, but the periphery of this ring comprises two conical surfaces 78 and 79 that are adapted to be engaged by a guide roller for lateral and radial guidance. Ring 85 (Fig. 17) has no web portion, and has conical working surfaces 86 and 87 at opposite sides and a conical peripheral surface 88, which is engaged by a guide roller.

The two working surfaces at opposite sides of each of the rings 65, 75, 85 are parallel. Their profiles, however, are inclined to the axis of each ring. Surfaces 66, 76, and 86 are external conical surfaces and are convex lengthwise. Surfaces 67, 77, and 87 are internal conical surfaces and are concave lengthwise. The working surfaces are narrow strips, but the thickness of the working portion of each ring is preferably made still smaller than the width of the working surfaces.

The rings and the friction discs themselves may be made of any suitable material, metallic or non-metallic, and, if metallic, may be made of any suitable metal including hardened steel.

Wear of the rings and discs may be taken up by adjustment of a disc 90 (Fig. 3) which has splined engagement with the shaft 30 and which is supported by an internally threaded ring 91. This ring threads onto an externally threaded disc 92 which is pinned or otherwise fixedly fastened to the shaft 30. A weak spring 93 is interposed between the discs 92 and 90 tending to separate these discs so that the discs 47, friction rings 53, and discs 50 are maintained in contact under a light load even when no torque is transmitted. The main load is obtained from the torque-transmitting coupling to be described hereinafter. Discs 47, rings 53, and discs 50 are squeezed together between the disc 90 and the head 52 of sleeve member 51, and the squeezing action increases with increase of the transmitted torque.

Mounted in the head 52 are a plurality of studs 95 on which are mounted spherical rollers 96 (Figs. 3 and 4). The shaft 30 is provided with four arms 97 in which are rotatably mounted pins 98 to which are secured shoes 100. The pins 98 are radial of the axis 40 of shaft 30 and in one position their axes coincide with the axes of the studs 95. This position is attained for light loads when there is no backlash and when backlash has been taken up. By turning the shoes 100 on their pivots 98, the inclination of the shoes can be varied so that the relative path between shaft 30 and the sleeve member 51, which is controlled by the contact between the rollers and their shoes, is changed. The relative displacement is composed of a turning displacement about the axis of shaft 30 and of a displacement along said axis. It is a substantially helical displacement. By changing the inclination of the shoes the lead angle of the helical path is changed and so is its lead.

In the position where the axes of the studs 95 and pins 98 coincide the angular adjustment of the shoes does not introduce any backlash. The load is then substantially radial of the axes of studs 95 and pins 98 so that even heavy loads do not tend to turn the shoes off of their adjusted positions.

The angular positions of the shoes are controlled by a linkage which will now be described. A sleeve 105 is connected through splines 106 to the shaft 30. Links 107 are each pivoted at one end on a radial stud 108 which is secured in sleeve 105 (Fig. 5). The axes of studs 108 are angularly aligned with pins 98 and are spaced therefrom in the direction of the axis of the shaft 30 a distance which is varied by displacement of the sleeve 105. At their opposite ends the links 107 are pivotally attached to the shoes 100 by pins 109 (Figs. 5, 6, 7 and 9). The pins 109 are rigidly secured to the shoes as by a press fit and welding.

Fig. 5 shows a position corresponding to a mean position of sleeve 105 and to a mean lead angle setting of shoe 100. In the position indicated in Fig. 6 the distance between the pivots 98 and 108 is increased, which means that sleeve 105 has been displaced away from cross arms 97. This results in a reduced angle 108—98—109 and in a reduced lead angle setting. In the position indicated in Fig. 7, the distance 98—108 is reduced. The sleeve 105 has been displaced toward the cross arms 97. This results in an increased angle 108—98—109 and in an increased lead angle setting.

The lead angle setting controls the constrained relative motion between the sleeve member 51 and the shaft 30 while the shoes 100 and rollers 96 are in contact. They are kept in contact by the torque transmitted through them. Within the limits used said relative motion is substantially a helical motion about the axis of rotation of the shaft 30. Its lead is determined by the lead angle setting of shoes 100.

Figure 10:
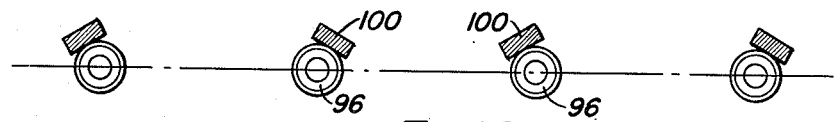
Fig. 10 is a diagrammatic developed view showing the rollers and the shoes of the coupling adjusted to a small lead angle.

The developed view of Fig. 10 corresponds to the link position of Fig. 6. The developed view of Fig. 11 corresponds to the position of Fig. 7. A pair of shoes are set to one lead angle and the remainder of the shoes are set to an equal and opposite lead angle. The lead of the relative path obtained with one side in contact is then equal and opposite to the lead obtained with the opposite side in contact. Preferably adjacent shoes are set to opposite lead angles; and preferably a plurality of shoes is set to one lead angle and the same number of shoes is set to an equal and opposite lead angle. In the example illustrated, the coupling contains four shoes. Two are set to one lead angle and two are set to the opposite lead angle.

Figure 11:
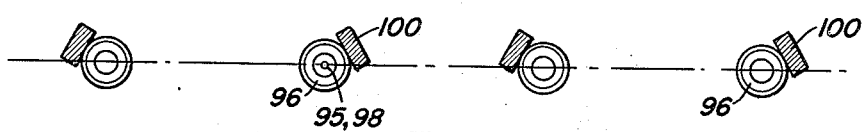
Fig. 11 is a similar view showing the rollers and shoes adjusted to a position of large lead angle.
Figure 12:
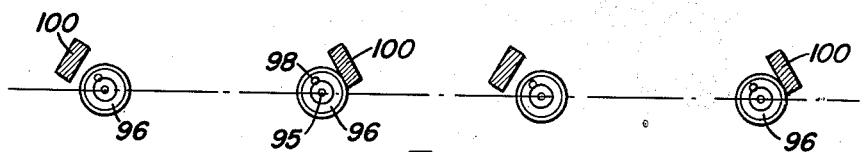
Fig. 12 is a view like Fig. 11 but showing the effect of blacklash resulting from wear.

Fig. 12 is a developed view showing the same angular setting of the shoes as Fig. 11 but with backlash between the two coupling members. The backlash is shown exaggerated. Backlash may develop through wear. It can be and should be taken up by adjustment of the nut 91 (Fig. 3).

The working surfaces of the shoes are made to approximate helical surfaces of constant lead, each of which is such as could be described by a roller with respect to a shoe set to a mean angle. This angle would be the lead angle of the roller center. The working surfaces 110 of the shoes have concave profiles (Fig. 9) centered at 112; and the profile radius is somewhat larger than the profile radius of the spherical roller 96, with which the shoe engages. Surface 110 is also curved lengthwise about a circle 114 (Fig. 8) whose center is at 115. This circle is the curvature circle of the mean helical surface which is to be approximated.

In principle, a plane working surface could also be used on the shoes. However, they would give less intimate contact. The position of sleeve 105 is controlled by slide 57. This slide has an inclined slot 116 (Fig. 3) in it which is engaged by a double conical roller 117. This roller has a V-shaped cross section. It is rotatably mounted on sleeve 105 in an axially fixed position. Radial adjustment of the slide 57 causes the roller 117 and the sleeve 105 to be displaced axially. This axial displacement in turn changes the inclination of the shoes 100. It changes the lead L of the substantially helical relative motion of the contacting coupling members. The need for such a change of lead will now be explained.

A given torque transmitted through the coupling causes an axial pressure P which is inversely proportional to said lead and inversely proportional to the trigonometrical tangent of the lead angle. This torque causes forces to be transmitted to the shaft 31 through frictional contact. The torque reaction of these forces on shaft 30 balances the input torque. The forces are proportional to the number of contacts N, to the axial pressure P, and to some kind of friction factor $m$, that is, to the product $NPm$.

Let R denote the distance of the forces from the axis of the shaft 30 so that R equals the distance 40—60 in the adjustment position shown in Fig. 1, and equals the distance 40—61 in Fig. 2. The torque reaction T then amounts to:

$$T = NPmR$$

The axial pressure P depends upon the input torque as follows:

$$PL = 2\pi T$$

Hence:

$$P \cdot \frac{L}{2\pi} = NPmR$$

or:

$$m = \frac{L}{2\pi RN}$$

$m$ is the proportion of the friction force to the axial load P. If $m$ is much smaller than its maximum value $m_0$ for safe transmission, then the pressure P is larger than it needs be; and frictional waste results. For minimum friction loss the factor $m$ should be kept near its maximum value $m_0$ so that the friction contacts are made under a pressure no larger than necessary for safe transmission. This is accomplished according to my invention by changing the lead L so that L/R is substantially constant. The lead L is then proportional to R. A substantially constant factor $m$ is then obtained. A proportion L/R is so chosen that $m$ is equal to $m_0$. Other effects may also be accomplished if desired.

A coupling of this general character with variable lead characteristics may be broadly applied to variable ratio friction transmissions including variable ratio V-belt drives. The lead of the coupling is made dependent on the ratio setting of the transmission. The lead changing means is operatively connected to the ratio changing means. With a torque transmitting coupling of this character the pressure of frictional engagement can be kept at a minimum for safe operation so that the efficiency of the power transmission is at a maximum at all ratios. The boost in efficiency is further accompanied by a valuable reduction in wear. Less friction loss means also less wear.

Another important feature of my invention will now be described. The friction rings are guided radially by rollers mounted on parallel axes. In one embodiment of the invention they are also guided laterally by rollers.

The rings, are arranged in pairs as indicated in Fig. 3. The rings are denoted generically as 53, but in the following description particular reference will be made to the rings 65 of Fig. 15. Adjacent rings are so positioned that either their convex conical sides 66 (Fig. 15) face each other, as is the case in Fig. 18, or their concave sides 67 face each other. The two rings of a pair are thus oppositely stressed sidewise.

As already stated, the friction rings may be guided laterally as they rotate, or they may be unguided. For guiding them sets of rollers 54 and 55, such as shown in Fig. 1, may be employed. Each set of rollers comprises pairs of rollers, such as shown at 54 and 54' in Fig. 18, for guiding the oppositely facing rings 65.

Figure 13:
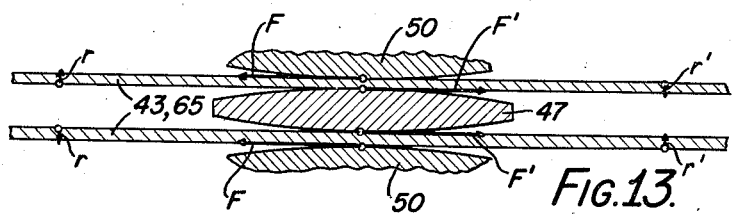
Fig. 13 is a somewhat diagrammatic, partial longitudinal sectional view taken along the pair of friction rings and through the friction discs which contact therewith, and showing some of the forces acting upon the rings when the rings are guided laterally.

As indicated in the diagrammatic sectional view of Fig. 13, which illustrates the condition where the rings are guided, the tangential friction loads F, F' exerted on each of a pair of rings 65 on opposite sides are opposite and substantially equal. They exert a lateral couple on the ring. This couple is balanced by the reactions $r$, $r'$ of cooperating guide rollers 54 and 55. It is seen that for reasons of symmetry the reactions $r$ are equal and opposite, as are also the reactions $r'$. The reactions $r$ are applied by a pair of coaxial rollers 54 and 54'. Likewise the reactions $r'$ are applied by another pair of coaxial rollers 55. According to my invention the opposite reactions $r$ and also $r'$, are balanced directly against each other without first transmitting them to the housing. The pairs of rollers are then left free to adjust themselves axially so that they will operate properly even after wear of the parts.

Figure 14:
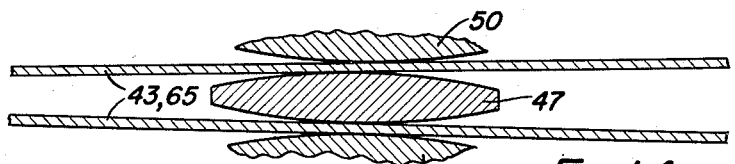
Fig. 14 is a fragmentary sectional view similar to Fig. 13 but illustrating the results when the rings are not guided laterally.

Fig. 14 shows the condition where the rings 65 are not laterally guided. The two rings of a pair are then slightly tipped laterally in opposite directions. In extreme cases, the two rings of a pair may even come into contact with each other and bear on each other without harmful effects, however.

Either method may be used. The latter mounting is simpler but the mounting, where the rings are guided laterally as well as radially, is more positive.

Rollers for guiding the friction rings laterally as well as radially are shown in Figs. 18 to 22 inclusive. These rollers 54 and 54' are arranged in pairs mounted on a pair of coaxial helical spline shafts 122 and 123. The working portion of the shaft 122 contains two diametrically opposite helical splines 124 (Fig. 20) and it is cut out to make room for splined shaft 123. At its ends, the shaft 122 is full and of standard construction but contains a bore that extends centrally through it. It is mounted on bearings 126 and 127 which are secured in caps or inserts 128 and 129. These inserts are secured to the slide 57.

Splined shaft 123 consists of a central portion 130 and of two diametrically opposite helical splines 124' winding around this shaft portion and secured to it by radial pins 132. The pins may be welded to the threads if desired.

The helical splines proper are identical on both shafts 122 and 123. Their hand is the same and their lead is the same. They may be cut at the same time on the same hollow shaft. If so, after completion of the splines the two shaft members are cut apart. The central shaft portion is then inserted and secured to shaft member 123 by pins 132 after having been provided with spaced elongated slots 133 (Fig. 18). Opposite splines 124 are secured together by pins 134 which pass through the slots 133. The pins 134 fit the sides of the slots 133 and connect the two shaft members 122 and 123 so that they may move axially relative to one another but not angularly. In other words, the two shaft members 122 and 123 are bound to rotate together.

The axial pressure of shaft member 123 is controlled by a roller 135 which is mounted (Fig. 18) in an axially fixed position on the central shaft portion 131. The conical sides 136 of this roller engage a conjugate straight slot 137 provided in the transmission casing or in a part secured to the transmission casing. The roller 135 and the shaft 123 are, therefore, axially displaced upon adjustment of the slide 57 upon which the shafts 122 and 123 are mounted. They are displaced in direct proportion to the adjustment of the slide 57.

The roller 54' engages the helical splines 124' of shaft portion 123 only and is cut out so that it will not contact the splines 124 of shaft portion 122. It may bear against the cylindrical outside surface of the splines 124, however. Roller 54 is similarly cut out so as to engage the helical splines 124 only. The two rollers are connected to be movable axially relative to each other but not angularly. They do not turn with respect to one another. This connection may be accomplished with pins 140 (Fig. 18) which fit into holes in the rollers 54' and which are rigidly secured to the rollers 54 by a press-fit or spot welding or both. The pins engage holes 141 provided on the rollers 54'.

With the described arrangement, an axial displacement of shaft member 123 in one direction causes the two rollers 54 and 54' of a pair to approach one another by the amount of the displacement. This is shown in Fig. 19. Axial displacement of the shaft member 123 in the opposite direction separates the two rollers 54 and 54' of a pair, as shown in Fig. 21. While the distance of the two rollers is positively controlled and made to correspond to the required separation of the friction rings at the various positions of slide 57, the pair of rollers may still adjust itself freely along its axis. The rollers can still slide together along the helical splines and adjust themselves directly to the friction discs 47. This self-adjustment is an important feature as the friction discs change their axial positions gradually somewhat as wear takes place.

In the embodiment shown in Fig. 22 a somewhat different mounting for the guide rollers is illustrated. Here there are also two coaxial splined shaft members 142 and 143 with helical splines 144 and 144', respectively. Here, however, the splines of each shaft member are adjacent to each other rather than diametrically opposite. With this construction, more rigid members are obtained. The shaft members are in this case also, however, free to move axially with respect to one another but not angularly.

A further modification of the invention is illustrated in Fig. 23. Here rollers 145, 146 and 147 which control the radial position of the friction rings 53 are located adjacent one another. The rollers are mounted in a common member or slide 150. This slide may be adjusted by fluid pressure through a piston 151 that moves in a cylinder 152. The piston has a piston rod 153 integral with it which is secured to the slide 150.

A still further modification of the invention is shown in Figs. 24 to 26 inclusive. In this embodiment, the two shafts are denoted at 160 and 161. These shafts are mounted on parallel axes in a transmission casing which is not shown. As before, the two shafts carry friction discs, like the discs 47 and 50 of Fig. 1 which are mounted on their respective shafts for rotation therewith but for axial displacement relative thereto. Of the two discs only the discs 47 are shown. Motion is transmitted through friction rings 53 which are guided by rollers 163, 164, and 165. These rollers are mounted in a common slide 167 which is adjustable to displace the rings.

The modification resides especially in the shape and motion of this slide 167. It is adjusted by means of a pair of spaced pinions 168 which engage racks 169 that are secured to the slide 167. The slide 167 is held in opposite directions by the pinion teeth and by the conical rollers 171 which abut against rails 172 that are secured to the slide 167. It is free, however, to tip about the axis of the pinion shaft 170, which is here disposed in the plane of the axes of the shafts 160 and 161. The slide 167 is further guided by a rotatable part 175 disposed at one side of the transmission casing. This part is mounted upon a shaft 176 which is journaled in the transmission casing and can be turned from the outside. It can also be locked to remain in a fixed angular position.

Part 175 is of cam form. Its sides engage the opposite sides of a straight slot 177 provided in the slide 167. The cam has circular arcuate profiles 178 and 179 whose centers are at 180 and 181, respectively. In the position shown in Fig. 24, the slot 177 is parallel to the plane of the axes of the shafts 160 and 161. This is the working position. Fig. 25 shows a position for ratio adjustment in operation under load. Cam 175 is turned so that the forward end of the slot 177 is lowered and member 167 is tipped about the axis of the pinion shaft 170. Its center line 184 has moved out of the plane 185 of the axes of the shafts 160, 161. The center 186 of the friction rings 53 is thus moved downwardly, staying in the line 184 and is now below the plane 185 of the axes 187 and 188 of the two shafts. This causes the ring periphery to be slightly inclined to the peripheries of the discs at the zone of frictional engagement so that there is a tendency to draw the ring in at an angle and to move it radially during rotation. The frictional engagement itself then tends to move the ring and to change the ratio setting. Thus, change in ratio may be obtained without effort during actual running. Figs. 24 and 25 are taken near one end of the shafts.

After the desired ratio setting is arrived at, the member 175 is turned back to the position shown in Fig. 24 and is locked there. The pinion shaft 170 is then also locked in known manner.

When the motion is downward at the zone of frictional engagement, the rings 43 and slide 167 will be moved to the left in operation when the cam 175 is in the angular position shown in Fig. 25. This causes the rings to approach to the axis 187 and increases the reduction ratio between the shafts 160 and 161. A decrease in the ratio may be obtained by turning the cam 175 in the opposite direction.

In this embodiment of the invention, the guideway for adjustment of the coupling member 52, corresponding to the guideway 116 of Fig. 3, is then disposed on a part 190 (Fig. 25) which is separate from the slide 167 and which is pivoted at 191 on the member 167 and securely guided about that pivot. An asset of this embodiment is that no guideways are required in the casing. Member 167 is guided solely by rotatable parts. This asset is also retained if the cam 175 is replaced by a roller which is mounted on a fixed axis and which engages the sides of the slot 177.

With the present invention it will be seen, then, that a friction transmission has been provided in which the axes of drive and driven shafts may remain fixed but in which the ratio of the transmission can nevertheless be readily adjusted. In this transmission, a small contact pressure is employed between the load-transmitting friction surfaces at all ratios. The drive is therefore subject only to minimum wear and will have a long life. With this transmission also means is provided for varying the contact pressure with the transmitted torque and in dependency on the ratio. Furthermore, the ratio may be changed under load.

While the invention has been described in connection with different embodiments thereof, it is capable of further modification and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A variable ratio friction transmission comprising two rotary elements mounted on parallel axes, a plurality of spaced, tapered friction discs mounted on each of said elements for rotation therewith and axial displacement thereon, the discs on one element being larger in diameter than the discs on the other element and extending into the spaces between the discs of said other element, friction rings interposed between adjacent discs of the two elements, each ring contacting with opposite sides of adjacent discs, said friction rings surrounding the axis of the element which carries the smaller set of discs and being larger in diameter than said smaller set of discs, a plurality of angularly spaced rollers for supporting said rings at spaced points around their peripheries, one of said rollers having portions adapted to contact with all of said rings, a member on which said rollers are mounted, means for adjusting said member to obtain different ratios, and means for creating pressure at the zones of contact of the rings and discs.

2. A variable ratio friction transmission, comprising two rotary elements, a plurality of tapered friction discs mounted on each of said elements for rotation therewith and axial displacement thereon, friction rings adapted to revolve about one of said elements and interposed between adjacent discs of the two elements and contacting therewith, a plurality of angularly spaced rollers for supporting said rings at spaced points around their peripheries, a slide on which said rollers are mounted, means for adjusting said slide to obtain different ratios, and means for creating pressure at the zones of contact of the rings and discs, some of said rollers having peripheral grooves to receive and hold said rings against both radial and axial movement.

3. A friction ring for variable ratio friction transmissions having a dished web portion which has substantially axially aligned working surfaces on opposite lateral sides thereof adjacent the periphery of the ring which are surfaces of revolution concentric with the axis of the ring, one of said surfaces being externally convex and the other internally concave, the radial length of the web portion being greater than the radial lengths of the working surfaces.

4. A friction ring for variable ratio friction transmissions having a dished web portion which has substantially axially aligned working surfaces on opposite lateral sides thereof adjacent the periphery of the ring which are surfaces of revolution concentric with the axis of the ring, one of said surfaces being externally convex and the other internally concave, the thickness of said ring being less than the widths of the working surfaces, the radial length of the web portion being greater than the radial lengths of the working surfaces.

5. A friction ring for variable ratio friction transmissions having a dished web portion which has substantially axially aligned working surfaces on opposite lateral sides thereof adjacent the periphery of the rings that are substantially equidistant throughout their radial lengths and whose axial profiles are inclined to planes perpendicular to the ring axis, the radial length of the web portion being greater than the radial lengths of the working surfaces.

6. A variable ratio friction transmission, comprising two rotary elements, friction means for operatively connecting said elements, means for adjusting the ratio of the transmission, a sleeve member coaxial with and axially movable on one of said elements, a plurality of rollers mounted on said sleeve member on substantially radial axes, a plurality of shoes adapted to contact with said rollers and mounted on said one element for adjustment about axes substantially radial of the axis of said one element and adjacent the axes of said rollers, said rollers and shoes being disposed in the path of transmitted torque to cause an axial separating force proportional to said torque and dependent on the inclination of said shoes, and means for adjusting said shoes on their axes, said means being operatively connected with said ratio adjusting means.

7. A variable ratio friction transmission, comprising two rotary elements, friction means for operatively connecting said elements, means for adjusting the ratio of the transmission, a sleeve member coaxial with and axially movable on one of said elements, a plurality of rollers mounted on said sleeve member on substantially radial axes, a plurality of shoes adapted to contact with said rollers and mounted on said one element for adjustment about axes substantially radial of the axis of said one element to cause the contacting members to move about and along the axis of said one element in a substantially helical relative path, adjacent shoes being oppositely inclined to correspond to helical paths of opposite hands, said rollers and shoes being disposed to transmit the entire torque of said one element to cause an axial separating force proportional to said torque and dependent on the inclination of said shoes, and means for adjusting said shoes.

8. A variable ratio friction transmission, comprising two rotary elements mounted for rotation on parallel axes, friction means for operatively connecting said elements, means for adjusting the ratio of the transmission, a torque-transmitting coupling coaxial with one of said elements, said coupling comprising a member having rollers mounted on substantially radial axes, and a mating member having shoes adapted to contact with said rollers and mounted on substantially radial pivots disposed adjacent said radial axes, and means for changing the inclination of said shoes by turning them about said radial pivots.

9. A variable ratio friction transmission, comprising two rotary elements, a plurality of tapered friction discs mounted to rotate with each of said elements, the discs of one element extending between the discs of the other element, friction rings interposed between adjacent discs of the two elements and contacting therewith, a member which is adjustable to control the ratio of the transmission, a plurality of rollers mounted on said member on a plurality of parallel axes and adapted to engage and guide said rings, coaxial rollers being arranged in pairs which are free to move axially, and means for controlling the axial distance between the rollers of each pair.

10. A variable ratio friction transmission, comprising two rotary elements, a plurality of tapered friction discs mounted to rotate with each of said elements, the discs of one element extending between the discs of the other element, friction rings interposed between adjacent discs of the two elements and contacting therewith, a member which is adjustable to control the ratio of the transmission, a plurality of rollers mounted on said member on a plurality of parallel axes and adapted to engage and guide said rings, coaxial rollers being arranged in pairs which are free to move axially, and means for controlling the axial distance between the rollers of each pair, said means being operatively connected with said adjusting member to vary said distance on adjustment of said member.

11. A variable ratio friction transmission, comprising two rotary elements, a plurality of tapered friction discs mounted to rotate with each of said elements, the discs of one element extending between the discs of the other element, friction rings interposed between adjacent discs of the two elements and contacting therewith, a member which is adjustable to control the ratio of the transmission, a plurality of rollers mounted on said member on a plurality of parallel axes and adapted to engage and guide said rings, coaxial rollers being arranged in pairs, and means for constraining the rollers of a pair to move axially comprising a pair of shafts which are coaxial with the pair of rollers and which have helical splines, one roller of the pair engaging the splines of one shaft and the other roller of the pair engaging the splines of the other shaft, and means for changing the relative positions of said shafts.

12. A variable ratio friction transmission, comprising two rotary elements mounted for rotation on parallel axes, a plurality of axially-spaced tapered friction discs mounted on each of said elements for rotation therewith and axial displacement thereon, the discs of one element extending into the spaces between the discs of the other element, friction rings interposed between opposite sides of adjacent discs of the two elements and contacting with the opposite sides of said adjacent discs, said friction rings being mounted eccentrically about the axis of one of said elements and being larger in diameter than the discs mounted on said one element, a plurality of angularly spaced rollers engaging the peripheries of said rings at points angularly spaced around their peripheries to support said rings, one of said rollers, at least, engaging the peripheries of a plurality of said rings, a member on which said rollers are mounted, means for adjusting said member to adjust said rings, and means for creating pressure between said discs and rings at their zones of contact.

13. A variable ratio friction transmission, comprising two rotary elements mounted on parallel axes, a plurality of axially-spaced, tapered friction discs mounted on each of said elements for rotation therewith and axial displacement thereon, the discs of one element extending into the spaces between the discs of the other element, friction rings mounted to revolve about the axis of one of said elements and interposed between adjacent discs of the two elements and contacting with the sides of adjacent discs of the two elements, a slide, said rings being larger in diameter than the discs of the element about the axis of which they revolve, a plurality of angularly spaced rollers mounted on parallel axes on said slide and engaging said rings at spaced points around their peripheries, one of said rollers, at least, engaging a plurality of said rings, means for adjusting said slide in a direction at right angles to the axes of said elements to obtain different ratios, and means for creating pressure at the zones of contact of the rings and discs.

14. A variable ratio friction transmission, comprising two rotary elements mounted on parallel axes, a plurality of axially-spaced, tapered friction discs mounted on each of said elements for rotation therewith and axial displacement thereon, the discs of one element being larger in diameter than the discs of the other element and extending into the spaces between the discs of said other element, a plurality of friction rings mounted to revolve about the axis of the element which carries the smaller set of discs, said friction rings being of larger diameter than said smaller set of discs and being interposed between and contacting opposite sides of adjacent discs of the two elements, a plurality of rollers for supporting said rings at spaced points around their peripheries, a common member, each of said rollers contacting the peripheries of a plurality of said rings and being mounted in said common member in two spaced bearings disposed adjacent opposite ends of said discs, means for adjusting said common member to adjust said rings to obtain different ratios, and means for creating pressure at the zones of contact between the rings and discs.

15. A variable ratio friction transmission, comprising two rotary elements mounted on parallel axes, a plurality of axially-spaced, tapered friction discs mounted on each of said elements for rotation therewith and axial displacement thereon, the discs of one element extending into the spaces between the discs of the other element, a plurality of friction rings interposed between and contacting opposite sides of adjacent discs of the two elements, a plurality of rollers for supporting said rings at spaced points around their peripheries, at least one of said rollers having a cylindrical surface contacting the peripheries of a plurality of said rings, a member on which said rollers are journaled, means for adjusting said member to obtain different ratios, and means for creating pressure at the zones of contact between the rings and discs.

16. A friction ring for variable ratio friction transmissions having a pair of opposed tapered working surfaces, one of said surfaces being an external surface and the other an internal surface, the outermost portion of the ring having a V-shaped profile and comprising two surfaces of straight line profile which are inclined to each other and to the working surfaces, both sides of said V-shaped profile being inclined to a plane, which is perpendicular to the axis of the ring and which passes through the apex of the V-shaped profile, and both sides of said V-shaped profile being shorter than the sides of said working surfaces.

ERNEST WILDHABER.

REFERENCES CITED

The following references are of record in the file of this patent:

UNITED STATES PATENTS

| Number | Name | Date |
|---|---|---|
| 1,257,742 | Ryland | Feb. 26, 1918 |
| 1,868,676 | Stoeckicht | July 26, 1932 |
| 1,963,599 | Tscherne | June 19, 1934 |
| 2,089,295 | Pollard | Aug. 10, 1937 |
| 2,123,007 | Hayes | July 5, 1938 |
| 2,216,191 | Erban | Oct. 1, 1940 |
| 2,233,967 | Wellton | Mar. 4, 1941 |

FOREIGN PATENTS

| Number | Country | Date |
|---|---|---|
| 375,068 | Great Britain | June 23, 1932 |
| 593,772 | Great Britain | Oct. 24, 1947 |
| 372,304 | Italy | June 23, 1939 |